United States Patent [19]

Nilssen

[11] Patent Number: 5,001,400

[45] Date of Patent: Mar. 19, 1991

[54] POWER FACTOR CORRECTION IN ELECTRONIC BALLASTS

[76] Inventor: Ole K. Nilssen, Caesar Dr., Barrington, Ill. 60010

[21] Appl. No.: 486,930

[22] Filed: Mar. 1, 1990

Related U.S. Application Data

[63] Continuation-in-part of Ser. No. 429,209, Oct. 12, 1989.

[51] Int. Cl.$^5$ .............................................. H05B 41/00
[52] U.S. Cl. ................................ 315/209 R; 315/172; 315/200 R; 315/283; 315/DIG. 5
[58] Field of Search .................... 315/172, 200 R, 205, 315/209 R, 227, 283, DIG. 5

[56] References Cited

U.S. PATENT DOCUMENTS 4,553,070  11/1985  Sairanen et al. ................ 315/209 R Primary Examiner—David Mis

[57] ABSTRACT

In a power-line-operated electronic ballast for a gas discharge lamp, an inverter converts a DC supply voltage to a high frequency current-limited operating voltage for a fluorescent lamp. The DC voltage is obtained, at least in part, by forward inductive-discharge conversion of full-wave-rectified unfiltered power line voltage; which forward conversion is accomplished by high frequency switching of an energy-storing inductor; the switching being done by the very same inverter that provides the high frequency lamp operating voltage. As an overall result, power is drawn from the power line with a power factor higher than 98% and with a total harmonic distortion under 10%.

28 Claims, 6 Drawing Sheets

5,001,400

POWER FACTOR CORRECTION IN ELECTRONIC BALLASTS

RELATED PATENT APPLICATION

This patent application is a continuation-in-part of application Ser. No. 07/429,209 filed Oct. 12, 1989.

BACKGROUND OF THE INVENTION

Field of the Invention

The present invention relates to high-power-factor power-line-operated electronic power supplies (ballasts) for gas discharge lamps.

In general, to meet industry requirements, a gas discharge lamp ballast has to draw power from the power line with a power factor of at least 90%. However, with many electronic ballasts, even at a power factor above 90%, the resulting harmonic distortion of the current drawn from the power line may be unacceptably high, particularly with respect to the so-called odd triplet harmonics.

In an electronic ballast—which generally requires a well filtered DC voltage for operating an inverter that powers the gas discharge lamp—by applying unfiltered full-wave-rectified power line voltage to a high frequency inductive-discharge forward converter, such well filtered DC voltage may be attained without incurring any substantial harmonic distortion of the current drawn from the power line. However, the cost penalty associated with providing a forward converter in an electronic ballast is substantial.

SUMMARY OF THE INVENTION

Objects of the Invention

An object of the present invention is the provision, in power-line-operated inverter-type power supplies for gas discharge lamps and/or other loads, of a more cost-effective means for attaining acceptably high power factor and low harmonic distortion with respect to the current drawn by the power supply from the power line.

This as well as other objects, features and advantages of the present invention will become apparent from the following description and claims.

BRIEF DESCRIPTION

In a power-line-operated electronic power supply for a gas discharge lamp (a ballast), an inverter converts a DC voltage of substantially constant magnitude to a high frequency current-limited operating voltage for a fluorescent lamp. The substantially constant magnitude DC voltage exists across an energy-storing capacitor and is obtained, at least in part, by forward inductive-discharge conversion of full-wave-rectified unfiltered 120Volt/60Hz power line voltage. The forward conversion is accomplished by high frequency switching of an energy-storing inductor, with the high frequency switching being done by the very same inverter that provides the high frequency lamp operating voltage. In certain situations, to improve efficiency, part of the energy supplied to the inverter from the DC voltage is derived directly from the full-wave-rectified power line voltage—at or near the peak of its instantaneous absolute magnitude—without being subjected to forward conversion.

DESCRIPTION OF THE PREFERRED EMBODIMENTS

Details of Construction

Figure 1:
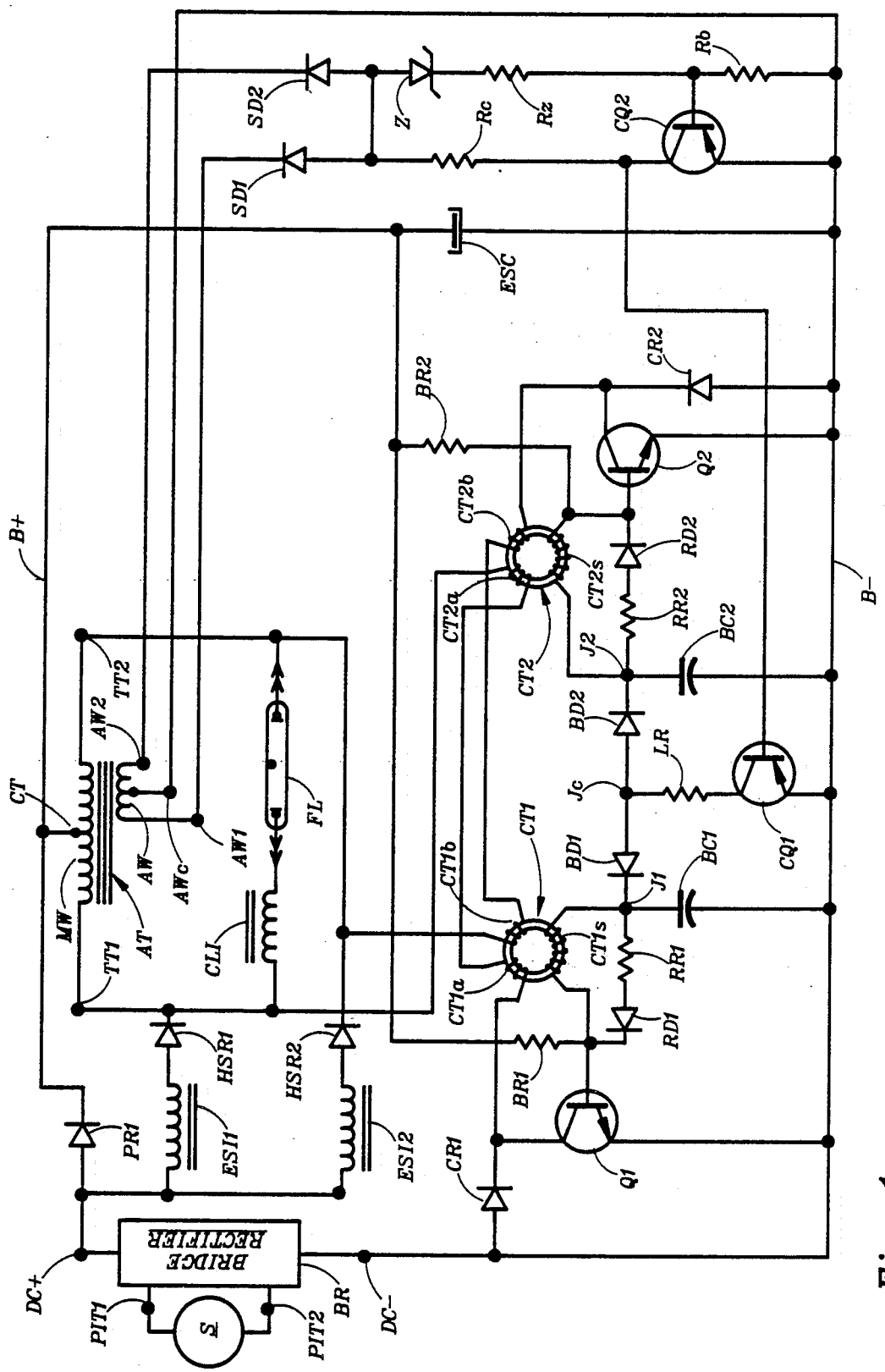
FIG. 1 schematically illustrates the invention in its first preferred embodiment.

FIG. 1 schematically illustrates the first preferred embodiment of the invention in the form of an electrical circuit diagram.

In FIG. 1, a source S represents an ordinary 120Volt/60Hz electric utility power line; which source S is connected with power input terminals PIT1 and PIT2 of a bridge rectifier BR. The output terminals of bridge rectifier BR are designated DC− and DC+, with DC− designating negative polarity.

The DC− terminal is directly connected with a B− bus; while the DC+ terminal is connected with a B+ bus by way of a power rectifier PR1, whose cathode is connected with the B+ bus. An energy-storing capacitor ESC is connected between the B− bus and the B+ bus.

An auto transformer AT has a main winding MW with transformer terminals TT1 and TT2, as well as a center-tap CT connected with the B+ bus. Also, transformer AT has an auxiliary winding AW with a center-tap AWc connected with the B− bus as well as two terminals AW1 and AW2 connected with the cathodes of two signal diodes SD1 and SD2, respectively, whose anodes are both connected with the anode of a Zener diode Z.

A first energy-storing inductor ESI1 is connected between the DC+ terminal and the anode of a first high speed rectifier HSR1, whose cathode is connected with transformer terminal TT1. A second energy-storing inductor ESI2 is connected between the DC+ terminal and the anode of a second high speed rectifier HSR2, whose cathode is connected with transformer terminal TT2.

A first inverter transistor Q1 is connected with its emitter to the B− bus and with its collector to the cathode of a first commutating rectifier CR1, whose anode is connected with the B− bus. A second inverter transistor Q2 is connected with its emitter to the B− bus and with its collector to the cathode of a second commutating rectifier CR2, whose anode is connected with the B— bus.

A first saturable current transformer CT1 has a secondary winding CT1s connected between the base of transistor Q1 and a junction J1. A second saturable current transformer CT2 has a secondary winding CT2s connected between the base of transistor Q2 and a junction J2.

A first bias capacitor BC1 is connected between junction J1 and the B— bus. A second bias capacitor BC2 is connected between junction J2 and the B— bus. A first bias diode BD1 is connected with its cathode to junction J1 and with its anode to a junction Jc. A second bias diode BD2 is connected with its cathode to junction J2 and with its anode to junction Jc. A first reset diode RD1 is connected with its cathode to the base of transistor Q1. A second reset diode RD2 is connected with its cathode to the base of transistor Q2. A reset resistor RR1 is connected between the anode of reset diode RD1 and junction J1. A reset resistor RR2 is connected between the anode of reset diode RD2 and junction J2.

A current-limiting inductor CLI is connected in series with a fluorescent lamp FL to form a series-combination; which series-combination is connected between transformer terminals TT1/TT2.

A first primary winding CT1a of current transformer CT1 is connected in series with a first primary winding CT2a of current transformer CT2 to form a first series-combination; and this first series-combination is connected between the collector of transistor Q1 and transformer terminal TT1.

A second primary winding CT2b of current transformer CT2 is connected in series with a second primary winding CT1b of current transformer CT1 to form a second series-combination; and this second series-combination is connected between the collector of transistor Q2 and transformer terminal TT2.

A first bias resistor BR1 is connected between the base of transistor Q1 and the B+ bus. A second bias resistor BR2 is connected between the base of transistor Q2 and the B+ bus.

A control transistor CQ1 connects with its emitter to the B— bus and, via a leakage resistor LR, with its collector to junction Jc. The base of transistor CQ1 connects with the collector of a control transistor CQ2, whose emitter and base are respectively connected with the B— bus and the cathode of Zener diode Z via a resistor Rz. A resistor Rb connects between the base and the emitter of transistor CQ2. A resistor Rc connects between the anode of Zener diode Z and the collector of transistor CQ2.

Figure 3:
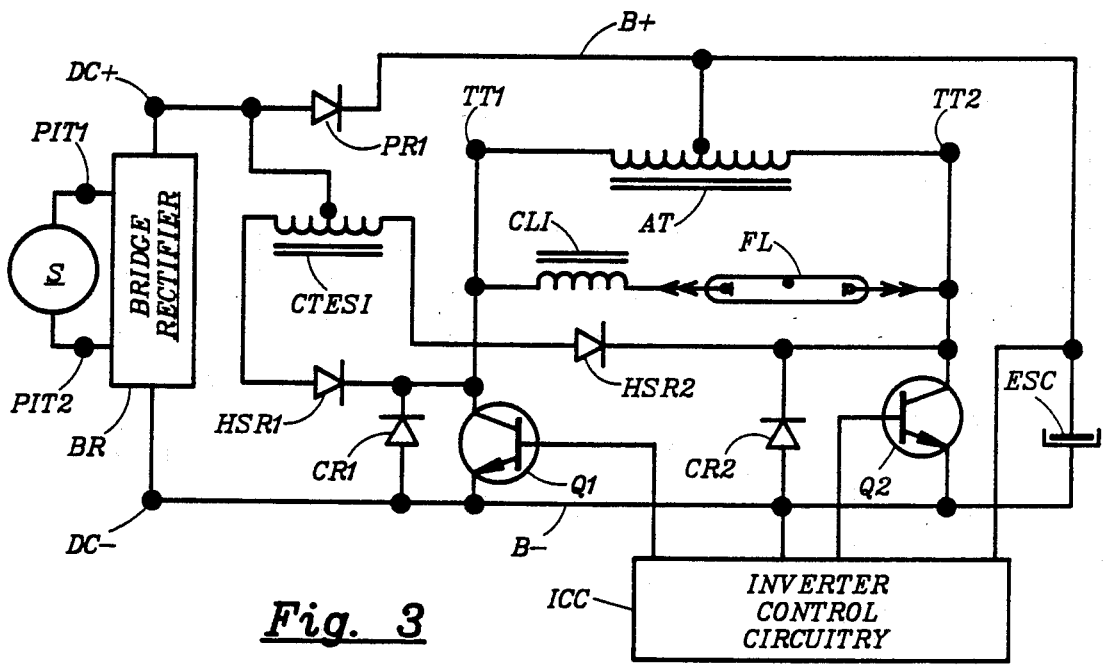
FIG. 3 schematically illustrates a first alternative version of the first preferred embodiment.

FIG. 3 illustrates a first alternative version of the first preferred embodiment of the invention; which first alternative version is identical to the first preferred version of FIG. 1 except that energy-storing inductors ESI1 and ESI2 have been replaced by a single center-tapped energy-storing inductor CTESI, whose center-tap is connected with the DC+ terminal and whose other two terminals are connected with the anodes of high speed rectifiers HSR1 and HSR2. Otherwise, for sake of clarity, the totality of the inverter control circuitry is represented by a single element referred-to as ICC; which element is connected with the B— bus, the B+ bus, the base of transistor Q1, and the base of transistor Q2.

Figure 4:
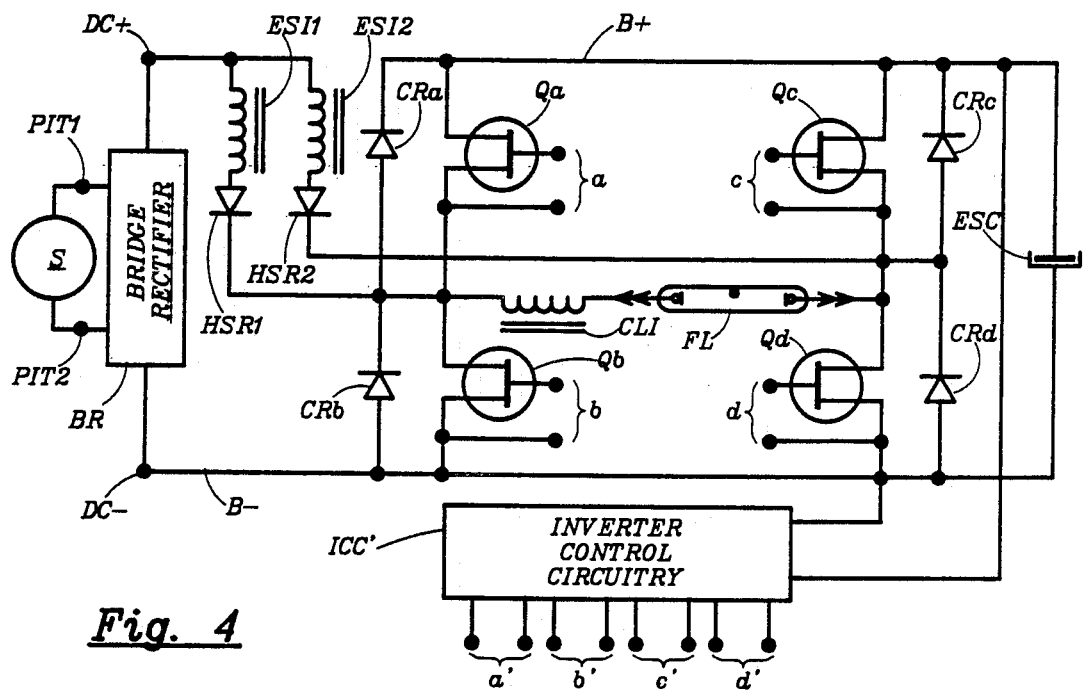
FIG. 4 schematically illustrates a second alternative version of the first preferred embodiment.

FIG. 4 illustrates a second alternative version of the first preferred embodiment; which second alternative version is a full bridge version of the arrangement of FIG. 1.

More particularly, in FIG. 4—just as in FIG. 1— power line source S is connected with bridge rectifier BR, thereby to provide an unfiltered full-wave-rectified power line voltage between terminals DC— and DC+.

A first field effect transistor Qa is connected with its drain to the B+ bus and with its source to the drain of a second field effect transistor Qb, whose source is connected with the B— bus. A third field effect transistor Qc is connected with its drain to the B+ bus and with its source to the drain of a fourth field effect transistor Qd, whose source is connected with the B— bus.

Each of transistors Qa, Qb, Qc and Qd has a set of control input terminals—a, b, c and d respectively—with each set of control input terminals being connected with the gate and the source of its associated transistor.

First energy-storing inductor ESI1 is connected between the DC+ terminal and the anode of first high speed rectifier HSR1, whose cathode is connected with the drain terminal of field effect transistor Qb. Second energy-storing inductor ESI2 is connected between the DC+ terminal and the anode of second high speed rectifier HSR2, whose cathode is connected with the drain terminal of field effect transistor Qd.

A commutating rectifier CRa is connected with its cathode to the drain terminal and with its anode to the source terminal of transistor Qa; a commutating rectifier CRb is connected with its cathode to the drain terminal and with its anode to the source terminal of transistor Qb; a commutating rectifier CRc is connected with its cathode to the drain terminal and with its anode to the source terminal of transistor Qc; and a commutating rectifier CRd is connected with its cathode to the drain terminal and with its anode to the source terminal of transistor Qd.

As before, current-limiting inductor CLI is connected in series with fluorescent lamp FL to form a series-combination; which series-combination is connected between the drain terminal of transistor Qb and the drain terminal of transistor Qd.

Also as before, energy-storing capacitor ESC is connected between the B— bus and the B+ bus.

Inverter control circuitry ICC' is connected with the B— bus, the B+ bus, and—by way of its control output terminals a', b', c' and d'—with corresponding control input terminals a, b, c and d of transistors Qa, Qb, Qc and Qd, all respectively.

Figure 5:
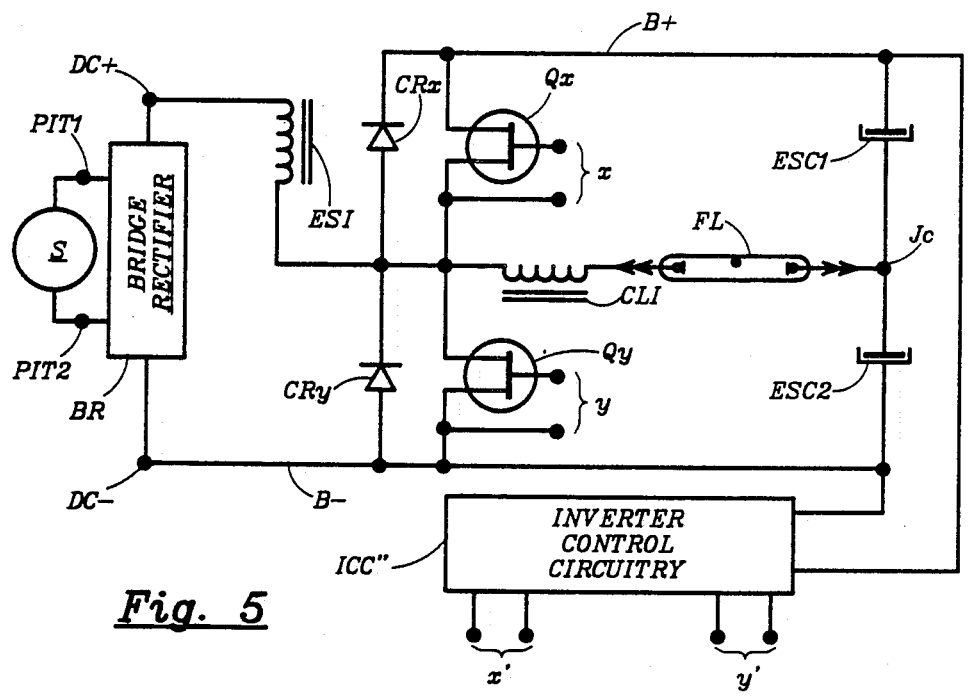
FIG. 5 schematically illustrates a third alternative version of the first preferred embodiment.

FIG. 5 illustrates a third alternative version of the first preferred embodiment; which third alternative version is a half-bridge version of the arrangement of FIG. 4.

More particularly, in FIG. 5—just as in FIG. 1— power line source S is connected with bridge rectifier BR, thereby to provide unfiltered full-wave-rectified power line voltage between terminals DC— and DC+.

A first field effect transistor Qx is connected with its drain terminal to the B+ bus and with its source terminal to the drain terminal of a second field effect transistor Qy, whose source terminal is connected with the B— bus.

Each of transistors Qx and Qy has a set of control input terminals—x and y, respectively—with each set of control input terminals being connected with the gate and the source of its associated transistor.

An energy-storing inductor ESI is connected between the DC+ terminal and the drain terminal of transistor Qy.

A commutating rectifier CRx is connected with its cathode to the drain terminal and with its anode to the source terminal of transistor Qx; and a commutating rectifier CRy is connected with its cathode to the drain terminal and with its anode to the source terminal of transistor Qy.

As before, current-limiting inductor CLI is connected in series with fluorescent lamp FL to form a series-combination; which series-combination is connected between the drain terminal of transistor Qy and a junction Jc.

A first energy-storing capacitor ESC1 is connected between junction Jc and the B+ bus. A second energy-storing capacitor ESC2 is connected between junction Jc and the B− bus.

Inverter control circuitry ICC" is connected with the B− bus, the B+ bus, and—by way of its control output terminals x' and y'—with control input terminals x and y of transistors Qx and Qy, all respectively.

Figure 6:
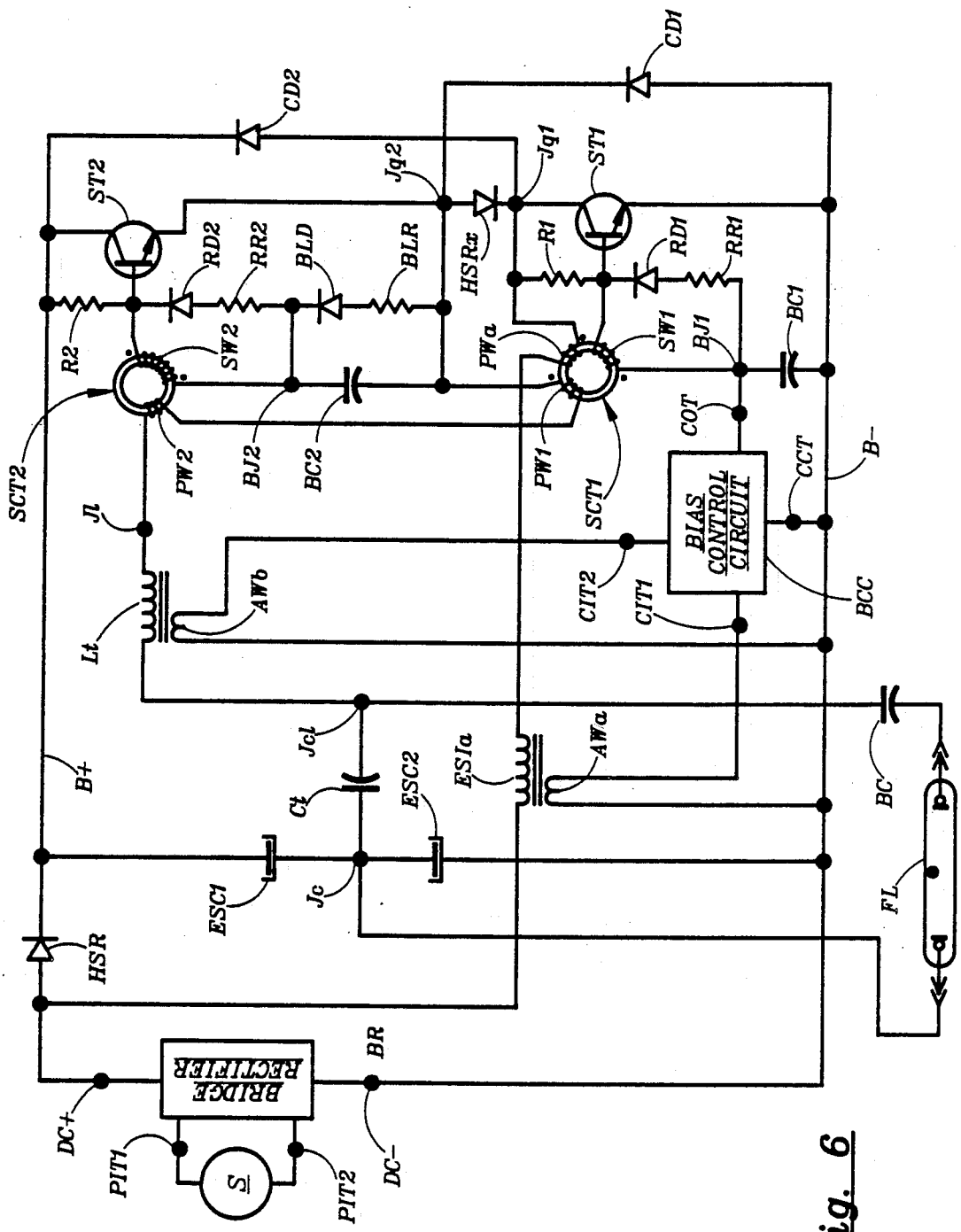
FIG. 6 schematically illustrates the invention in its second preferred embodiment; which second preferred embodiment represents the embodiment currently preferred overall.

FIG. 6 illustrates the invention in its second preferred embodiment; which represents the embodiment currently preferred overall.

In FIG. 6, power source S provides its power line voltage across power input terminals PIT1/PIT2 of bridge rectifier BR; which, in turn provides an unfiltered DC voltage between the rectifier's output terminals DC− and DC+.

An energy-storing inductor ESIa is connected between terminal DC+ and, via a primary winding PWa on a first saturable current transformer SCT1, to a junction Jq1. Inductor ESIa has an auxiliary winding AWa connected between a B− bus and a first control input terminal CIT1 of a bias control circuit BCC; which bias control circuit BCC has a common control terminal CCT connected with the B− bus.

The DC− terminal is connected with the B− bus; the DC+ terminal is connected with the anode of a high speed rectifier HSR, whose cathode is connected with a B+ bus.

A first energy-storing capacitor ESC1 is connected between the B+ bus and a junction Jc; and a second energy-storing capacitor ESC2 is connected between junction Jc and the B− bus.

A tank capacitor Ct is connected between junction Jc and another junction Jc1; and a tank inductor Lt is connected between junction Jc1 and a junction J1. A primary winding PW2 on a second saturable current transformer SCT2 is connected in series with a primary winding PW1 on saturable current transformer SCT1 to form a series-combination; which series-combination is connected between junction J1 and a junction Jq2. An auxiliary winding AWb on tank inductor Lt is connected between the B− bus and a control input terminal CIT2.

A secondary winding SW1 on saturable current transformer SCT1 is connected between the base of a first switching transistor ST1 and a first bias junction BJ1. A secondary winding SW2 on saturable current transformer SCT2 is connected between the base of a second switching transistor ST2 and a second bias junction BJ2.

A resistor R1 is connected between the collector and the base of switching transistor ST1; and a resistor R2 is connected between the collector and base of switching transistor ST2.

A bias capacitor BC1 is connected between bias junction BJ1 and the emitter of switching transistor ST1; and a bias capacitor BC2 is connected between bias junction BJ2 and emitter of switching transistor ST2.

A high speed rectifier HSRx is connected with its cathode to junction Jq1 and with its anode to junction Jq2.

A first commutating diode CD1 is connected with its anode to the B− bus and with its cathode to junction Jq2. A second commutating diode CD2 is connected with its anode to junction Jq1 and with its cathode to the B+ bus.

A reset diode RD1 is connected with its cathode to the base of switching transistor ST1 and, via reset resistor RR1, to junction BJ1. A reset diode RD2 is connected with its cathode to the base of switching transistor ST2 and, via reset resistor RR2, to junction BJ2. A bias leakage resistor BLR is connected between junction Jq2 and the anode of a bias leakage diode BLD, whose cathode is connected with junction BJ2.

A control output terminal COT of bias control circuit BCC is connected with junction BJ1.

DETAILS OF OPERATION

Figure 2:
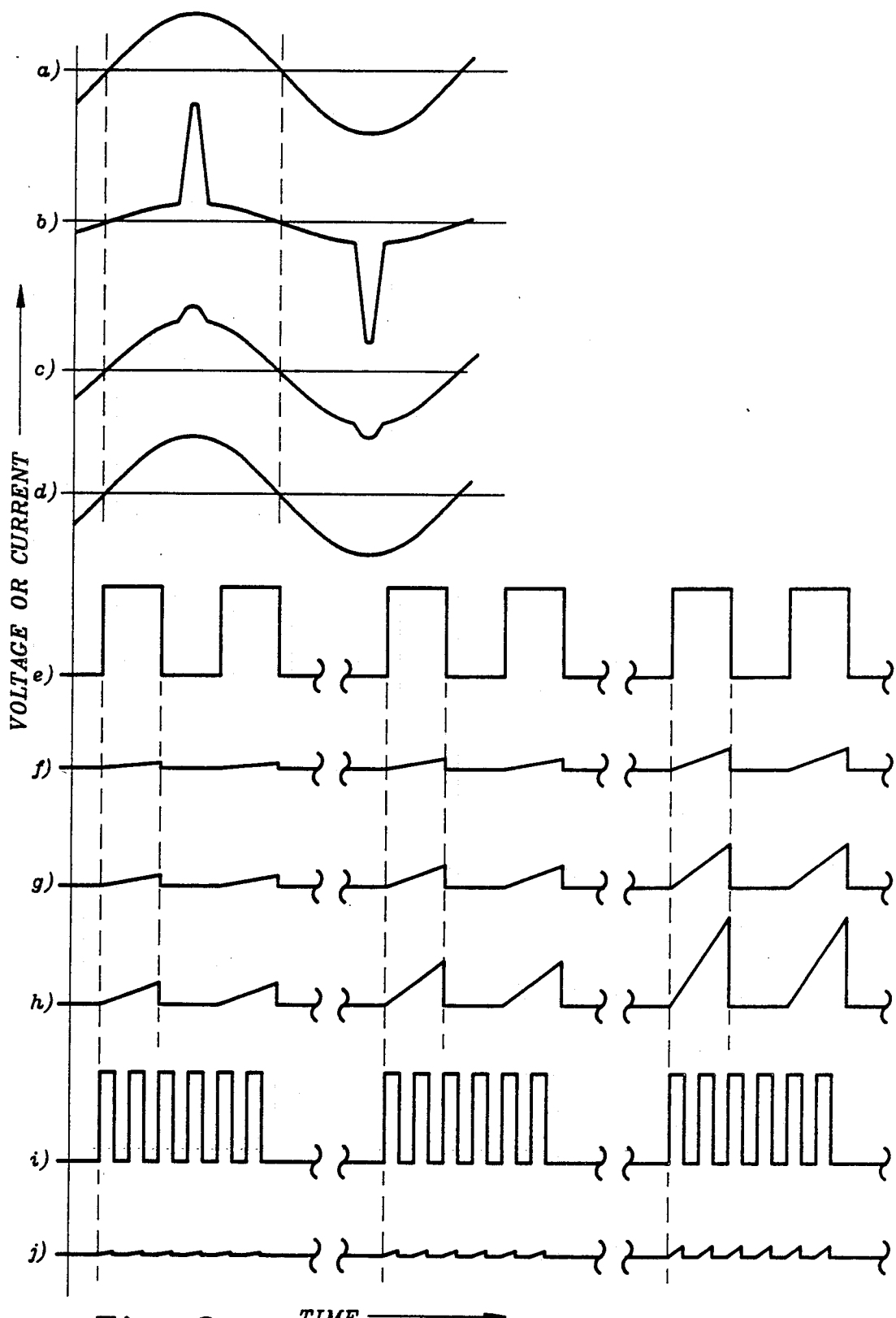
FIG. 2 shows various current and voltage waveforms associated with the operation of the arrangement of FIG. 1.

FIG. 2 indicates various current and voltage waveforms illustrative of the operation of the arrangement of FIG. 1.

FIG. 2a shows the waveform of the 120Volt/60Hz power line voltage.

FIG. 2b shows the waveform of the current drawn from the power line when operating the circuit under a condition where the inductance values of inductors ESI1 and ESI2 are each of a relatively high magnitude.

FIG. 2c shows the waveform of the current drawn from the power line when operating the circuit under a condition where the inductances of inductors ESI1 and ESI2 are each of a medium magnitude.

FIG. 2d shows the waveform of the current drawn from the power line when operating the circuit under a condition where the inductance values of inductors ESI1 and ESI2 are each of a relatively low magnitude.

FIG. 2e shows the waveform of the squarewave voltage present between the B− bus and the collector of transistor Q1.

For each of three different values of the instantaneous magnitude of the DC supply voltage present between the DC− and the DC+ terminals:

FIG. 2f shows the waveform of the current flowing through energy-storing inductor ESI1 under the condition associated with FIG. 2b (i.e., ESI being of relatively high inductance);

FIG. 2g shows the waveform of the current flowing through energy-storing inductor ESI1 under the condition associated with FIG. 2c (i.e., ESI1 being of medium inductance); and FIG. 2h shows the waveforms of the current flowing through energy-storing inductor ESI1 under the condition associated with FIG. 2d (i.e., ESI1 being of relatively low inductance).

When the fluorescent lamp (FL) is either inoperative of disconnected, for a situation where the inductance of energy-storing inductor ESI1 is of a medium magnitude:

FIG. 2i shows the waveform of the squarewave voltage present between the B− bus and the collector of transistor Q1; and FIG. 2j shows—for each of the three different values of the instantaneous magnitude of the DC supply voltage—the waveform of the current flowing through energy-storing inductor ESI1.

With reference to the waveforms of FIG. 2, the operation of the circuit arrangement of FIG. 1 may be explained as follows.

Except for the biasing arrangement associated with bias capacitors BC1 and BC2, the inverter of FIG. 1—which consists of main circuit elements Q1/Q2, CT1/CT2 and AT, and which is powered from the DC voltage present across energy-storing capacitor ESC—operates in a substantially conventional manner, similar to that of the inverter circuit of FIG. 4 in U.S Pat. No. 4,184,128 to Nilssen. However, in contrast with Nilssen's arrangement, the inverter of FIG. 1 need not be triggered into oscillation. Rather, it will start oscillations by itself as a result of the initial bias current provided via bias resistors BR1 and BR2.

The indicated biasing arrangement, which consists of bias capacitors BC1/BC2 and a bias current leakage means which includes leakage resistor LR and control transistor CQ1, operates such as to control the magnitude of the negative bias developing on each of the two bias capacitors as a result of the base current provided to each of the two switching transistors (Q1/Q2). If the magnitude of the negative bias on each of the bias capacitors is caused to increase, the inverter frequency increases; if the magnitude of the negative bias is caused to decrease, the inverter frequency decreases.

More particularly, the magnitude of the negative bias is controlled by the amount of current that is allowed to leak away from the bias capacitors via leakage resistor LR and control transistor CQ1.

With control transistor CQ1 non-conductive, the negative bias developing on bias capacitors BC1/BC2 (as a result of the base current provided to the bases of transistors Q1/Q2) will increase rapidly and—with the circuit components actually used—to a point where the oscillation will choke itself off. Thereafter, the highly negative bias having been developed on each of the bias capacitors will slowly leak off via bias resistors BR1/BR2; and a point will eventually be reached where the inverter will again start oscillating, only to choke itself off again; etc.

Thus, with control transistor CQ1 non-conductive, the inverter will operate in a so-called squegging mode: it will oscillate for a brief period; whereafter it will remain nonoscillatory for an extended period of time; whereafter it will again oscillate for a brief period; etc.

With control transistor CQ1 fully conductive, the magnitude of the negative bias on bias capacitors BC1/BC2 will be prevented from increasing so much as to cause the inverter to squegg. Instead, by choice of the resistance value of leakage resistor LR, the magnitude of the negative bias is so limited as to cause the inverter to stably oscillate at a frequency appropriate to power the fluorescent lamp FL at the desired level. In an actual embodiment, the magnitude of the negative bias voltage was limited to about 1.5 Volt, at which point the frequency of inverter oscillation was about 25 kHz and the power provided to the fluorescent lamp means (FL) was about 50 Watt.

With the inverter oscillating at 25 Khz, and with control transistor CQ1 fully conductive, the inverter output voltage —which is provided between transformer terminals TT1 and TT2 —will be as indicated by FIG. 2e in terms of the voltage present at terminal TT1.

During normal inverter operation, transistors Q1/Q2 will alternatingly constitute a short circuit to the B— bus. Thus, transistor Q1 constitutes a short circuit to the B— bus each time the instantaneous magnitude of the voltage of FIG. 2e is zero. Each time transistor Q1 constitutes such a short circuit, current will flow through energy-storing inductor ESI1—as indicated by FIG. 2f–j—and energy-storing inductor ESI1 will be charged. As for instance seen in FIG. 2h, the magnitude to which the current will grow increases linearly with the duration over which it is allowed to grow.

The current waveforms of FIG. 2f–j are shown for three different instantaneous magnitudes of the DC voltage present between the B— bus and terminal DC+; which is the DC voltage operative to charge energy-storing inductors ESI1/ESI2. The first of the three groups of current waveforms corresponds to a point in time where the magnitude of the DC voltage is half as large as that of the DC voltage associated with the second group; and the second group, in turn, corresponds to a point in time where the magnitude of the DC voltage is half as large as that of the DC voltage associated with the third group. Thus, the magnitude to which the current in the energy-storing inductors will grow is a linear function of the magnitude of the DC voltage present across these inductors—i.e., the DC charging voltage.

As an overall result, for a given inductance value, the average current flowing through the energy-storing inductors will increase linearly with the magnitude of the DC voltage present between the DC— terminal and the DC+ terminal; which means that the magnitude of the current drawn from the power line—to the extent it is drawn through energy-storing inductors ESI1-/ESI2—will be proportional to the instantaneous magnitude of the power line voltage; which, in turn and in effect, corresponds to a power factor of 100% and a total harmonic distortion of 0%.

The effect of power rectifier PR1 is that of charging energy-storing capacitor ESC directly from the DC+ terminal, thereby by-passing the forward conversion process. However, such direct charging of capacitor ESC can only occur whenever the magnitude of the DC voltage at the DC+ terminal is larger than the magnitude of the DC voltage present at capacitor ESC; which, in turn, can only occur when the power transferred to capacitor ESC by forward conversion is less than that being supplied by the inverter to its load (fluorescent lamp FL).

As indicated by FIG. 2b, whenever the inductance of energy-storing inductors ESI1/ESI2 is relatively high, a significant amount of energy—as indicated by the area of the narrowly peaked part (i.e., the spike) of the waveform—is provided directly from terminal DC+ to capacitor ESC. This energy flows directly from the DC+ terminal, through power rectifier PR1, to the B+ terminal.

Of course, as may be seen by direct inspection of the waveform of FIG. 2b, the values for power factor and harmonic distortion associated with the power line current of FIG. 2b are not highly desirable.

As indicated by the waveform of FIG. 2d (which, due to the complete absence of a charging spike, indicates that no direct charging of capacitor ESC takes place), whenever the inductance of energy-storing inductors ESI1/ESI2 is relatively low, all the energy provided to capacitor ESC (i.e., to the load) is provided via forward conversion. As a result, as may be seen by direct inspection of the waveform of FIG. 2d, the values for power factor and harmonic distortion associated with the power line current are highly desirable: essentially 100% and 0%, respectively.

The situation associated with the waveforms of FIG. 2c corresponds to that of the preferred embodiment; in which embodiment a certain part of the energy provided to capacitor ESC (i.e., to the load) is provided by direct charging via power rectifier PR1. By providing such certain part of the energy via direct charging, thereby correspondingly reducing forward conversion losses, a substantial improvement in energy efficiency results without any significant negative impact on the values for power factor and total harmonic distortion. In particular, the waveform of FIG. 2c corresponds to a power factor of over 98% and a total harmonic distortion of well under 20%; both of which values are highly desirable in terms of industry requirements.

As power is initially applied to the circuit arrangement of FIG. 1, capacitor ESC charges up to the peak magnitude of the power line voltage and current starts flowing through bias resistors BR1/BR2, thereby to cause transistors Q1/Q2 to become activated; which, as a result of the positive current feedback provided via saturable current transformers CT1/CT2, causes the inverter to start oscillating, thereby generating a squarewave voltage across main transformer winding MW. The absolute magnitude of this squarewave voltage will be exactly equal to twice that of the DC voltage on capacitor ESC.

As soon as the inverter starts to oscillate, a squarewave voltage of magnitude proportional to that of the DC voltage on capacitor ESC will be provided at terminals AW1/AW2 of auxiliary winding AW. This squarewave voltage is rectified by signal diodes SD1/SD2, and the resulting auxiliary DC voltage provides—via resistor Rc—base current to transistor CQ1 of sufficient magnitude to cause this transistor to become fully conductive, thereby providing for leakage resistor LR to prevent the negative bias on bias capacitors BC1/BC2 from becoming excessive.

During normal fully-loaded operation, the magnitude of the DC voltage across capacitor ESC is too low to cause the magnitude of the squarewave voltage provided at terminals AW1/AW2 of auxiliary winding AW to be so high as to cause Zener diode Z to conduct; which therefore means that, under normal fully-loaded operation, transistor CQ2 remains non-conductive.

However, at a reduced load, if the magnitude of the DC voltage across capacitor ESC were to increase to a level high enough to cause Zener diode Z to conduct, transistor CQ2 will start receiving base current; which base current will cause it to conduct, thereby to cause transistor CQ2 to rob some of the base current provided to the base of transistor CQ1; thereby, in turn, to cause a reduction in the conduction of transistor CQ1; thereby to permit the negative bias on bias capacitors BC1/BC2 to increase to higher levels; thereby to cause the inverter frequency to increase—eventually to the point of limiting the charging of capacitor ESC to a point where the magnitude of the DC voltage across it ceases to increase.

The Zener voltage of Zener diode Z is so selected as to permit the magnitude of the DC voltage across capacitor ESC to increase to a certain level (i.e., a level somewhat higher than that corresponding to the peak magnitude of the power line voltage) before base current starts to be provided to transistor CQ2. Thus, after the magnitude of this DC voltage exceeds this certain level, a negative feedback effect occurs; by which negative feedback effect the inverter frequency is caused to increase enough to prevent the magnitude of the DC voltage across capacitor ESC from exceeding a predetermined level.

Without providing for the indicated negative feedback effect, at light loads, the forward conversion may provide for enough power to cause the magnitude of the DC voltage across capacitor ESC to increase far beyond the indicated predetermined level. In fact, this magnitude would be apt to increase to destructively high levels.

In case no loading were to be provided at the inverter output, the indicated negative feedback effect would cause the inverter to enter a squegging mode: it would oscillate for a brief period, thereby causing the magnitude of the DC voltage across capacitor ESC to increase to the point of causing Zener diode Z to conduct enough to cause transistor CQ1 to become totally non-conductive; which, in turn, will permit enough negative bias to build up on bias capacitors BC1/BC2 to cause the inverter to choke itself off, ceasing oscillating altogether until the negative bias on bias capacitors BC1/BC2 has been dissipated by leakage through bias resistors BR1/BR2.

The arrangement of FIG. 3 operates in the same basic manner as that of FIG. 1, except that the two separate energy-storing inductors ESI1/ESI2 of FIG. 1 have been replaced by a single center-tapped energy-storing inductor CTESI.

The arrangement of FIG. 4 represents a full bridge version of the arrangement of FIG. 1; but otherwise it operates in basically the same manner as does the arrangement of FIG. 1.

One important difference, however, is that the magnitude of the DC voltage across energy-storing capacitor ESC now should be at least twice that of the peak magnitude of the full-wave-rectified power line voltage. Thus, the arrangement of FIG. 4 does not -- except on start-up -- permit any charging of capacitor ESC directly from the DC+ terminal. Rather, all the energy used by the load has to be handled via forward conversion.

Another item to note is that the forward conversion is handled by transistors Qb and Qd as combined with rectifiers CRa and CRc. Transistors Qa and Qc are not used for the forward conversion; neither are rectifiers CRb and CRd. Thus, the magnitudes of the currents handled by elements Qb/Qd and CRa/CRc are substantially larger than those handled by elements Qa/Qc and CRb/CRd; which means that the current-handling capabilities of elements Qa/Qc and CRb/CRd may be relaxed compared with those of elements Qb/Qd and CRa/CRc.

The arrangement of FIG. 5 represents a half-bridge version of the arrangement of FIG. 1; but otherwise it operates in a manner similar to that of the arrangement of FIG. 1.

As with the arrangement of FIG. 4, the magnitude of the DC voltage across energy-storing capacitor ESC now should be at least twice that of the peak magnitude of the full-wave-rectified power line voltage. Thus, the arrangement of FIG. 5 does not—except on start-up—permit any charging of capacitors ESC1/ESC2 directly from the DC+ terminal. Rather, all the energy used by the load has to be handled via forward conversion. Moreover, forward conversion now takes place only during every other half-cycle of the inverter's oscillation; which results in a conversion current of peak magnitude twice as large as otherwise would be the case.

Also, in a manner similar to that of the arrangement of FIG. 4, transistor Qy and rectifier CRx handle all the currents associated with the forward conversion. Thus, the current handling requirements of elements Qx and CRy may be substantially relaxed as compared with those of elements Qy and CRx.

Figure 7:
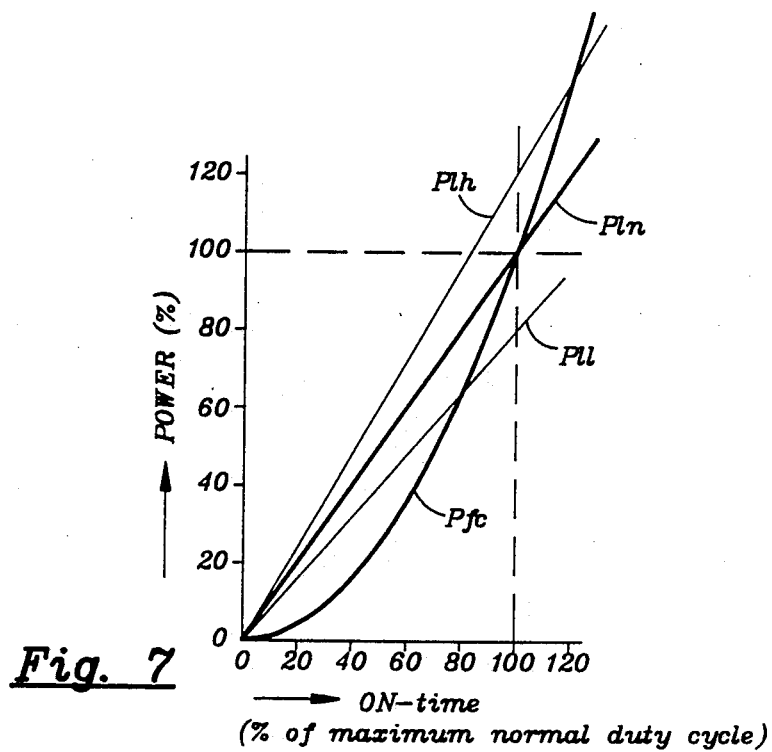
FIG. 7 indicates, for a given conversion frequency and for three different levels of DC supply voltage, as function of a transistor's ON-time, curves showing power provided to a fixed output load as well as power provided via forward conversion.
Figure 8:
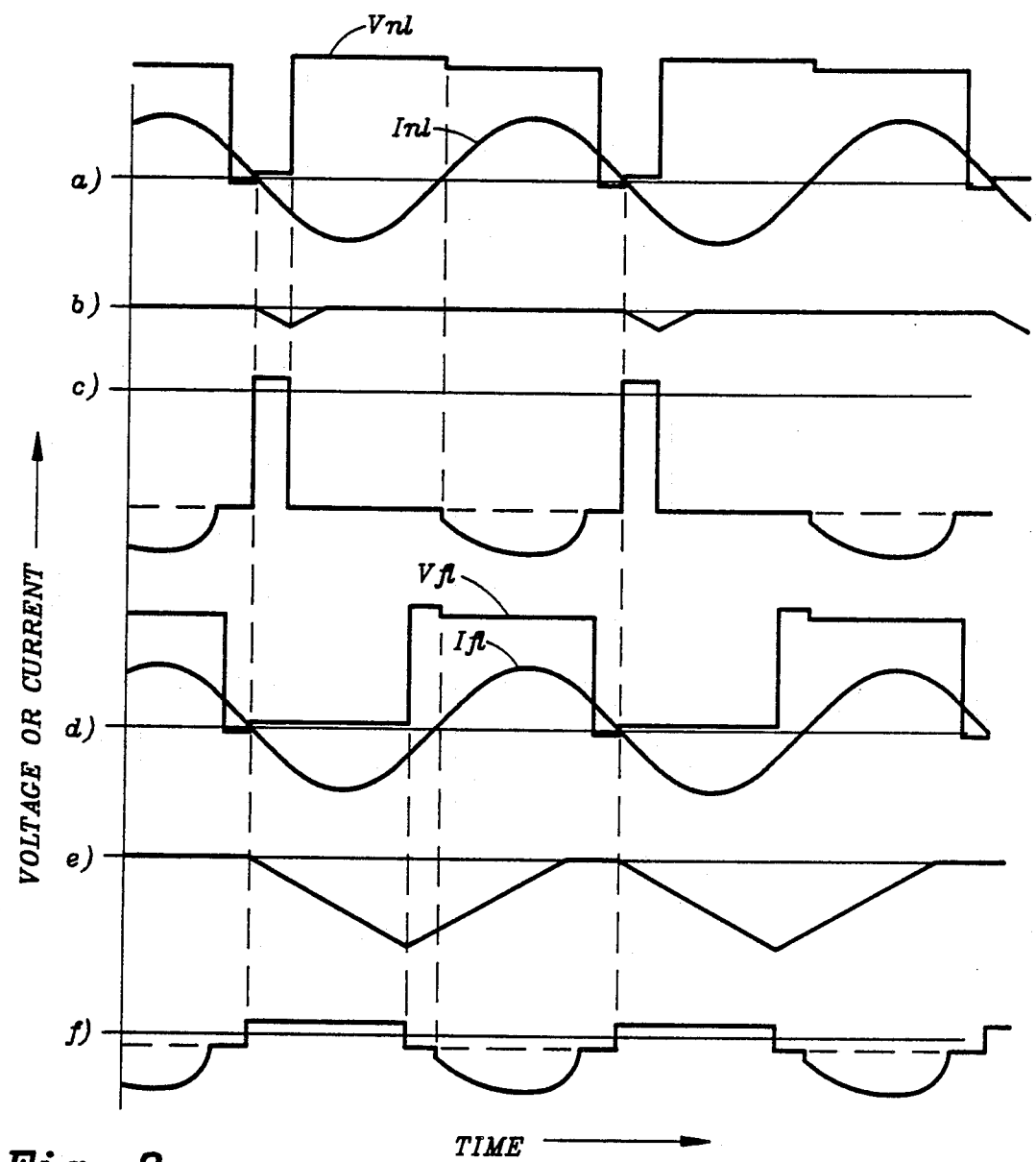
FIG. 8 shows various voltage/current waveforms associated with the circuit of FIG. 6.

The operation of the arrangement of FIG. 6 is best understood with reference to the graphs of FIG. 7 and the waveforms of FIG. 8.

FIG. 7 indicates, for a substantially constant conversion frequency and for three different magnitudes for the DC supply voltage (as present between the B— bus and the B+ bus), the relationship between the relative duration of the ON-time of switching transistor ST1 and: (i) by way of the solid curve marked Pfc, the amount of power drawn through energy-storing inductor STIa and deposited onto energy-storing capacitors ESC1/ESC2 by way of the forward conversion effected by switching transistor ST1 and commutating diode CD2; and (ii) by way of the three straight dashed lines marked Plh, Pln and Pll, the amount of power provided to the load FL at—respectively—20% high, normal, and 20% low DC supply voltage magnitudes.

FIG. 8 shows various voltage and current waveforms associated with the operation of the circuit of FIG. 6.

FIG. 8(a) shows the voltage Vn1 at junction Jq2 (referenced to the B— bus) as well as the current In1 flowing through tank inductor Lt under the condition of having no load connected with the series-tuned tank circuit (Ct and Lt).

FIG. 8(b) shows the current flowing through energy-storing inductor ESIa under the condition of having no load connected with the series-tuned tank circuit.

FIG. 8(c) shows the voltage at the base of switching transistor ST1 (referenced the B— bus) under the condition of having no load connected with the series-tuned tank circuit.

FIG. 8(d) shows the voltage Vf1 at junction Jq2 as well as the current If1 flowing through tank inductor Lt under the condition of having the series-tuned tank circuit fully loaded —as with fluorescent lamp FL.

FIG. 8(e) shows the current flowing through energy-storing inductor ESIa under the condition of having the series-tuned tank circuit fully loaded.

FIG. 8(f) shows the voltage at the base of switching transistor ST1 under the condition of having the series-tuned tank circuit fully loaded.

Now, with reference to the curves and waveforms of FIGS. 7 and 8, the operation of the arrangement of FIG. 6—to the degree that it is differs from that of the arrangement of FIG. 5 —may be explained as follows.

One important difference between the FIG. 5 arrangement and the FIG. 6 arrangement is that the output of the half-bridge inverter in the FIG. 6 arrangement is loaded with a series-resonant L-C circuit.

Being loaded with a series-resonant L-C circuit, the inverter of FIG. 6 will oscillate at a frequency that—depending upon loading conditions—may vary somewhat, but which is generally substantially constant at about 30 kHz. The net energy being supplied to the L-C circuit per inverter cycle is in part determined by the length of the ON-time of the lower switching transistor ST1 as compared with the period of the more-or-less constant inverter frequency: maximum energy being supplied when the ON-time represents 50% of the period of the total inverter cycle. However, the amount of energy supplied to the L-C circuit per inverter cycle also depends on the phasing of this ON-time relative to the phasing of the current flowing in the L-C circuit; which phasing is determined by the drive circuitry used for actuating the switching transistors.

For further explanations relative to the basic operation of the self-oscillating inverter circuit that is part of the FIG. 6 arrangement, reference is made to U.S. Pat. No. 4,677,345 to Nilssen, particularly to FIG. 8 thereof.

In FIG. 8 herein, FIG. 8(a) shows a situation where a very small amount of energy is being supplied to the L-C circuit per inverter cycle; which very small amount of energy is just sufficient to supply the idling-losses of the unloaded L-C circuit. This amount of energy is indeed seen to be small by virtue of the fact that -- during the ON-time of switching transistor ST1, the timing and duration of which ON-time are indicated by the positive-going pulse of FIG. 8(c)—the net energy supplied from the inverter to the idling unloaded L-C circuit is the difference between the energy supplied by the inverter during this ON-time and the energy absorbed by the inverter (and put back into its DC supply) during the brief period just preceeding the onset of this ON-time and during which the magnitude of the voltage (Vn1) across lower switching transistor ST1 is substantially of zero magnitude.

That is, in FIG. 8(a), the total net energy provided from the inverter's output is the time-integrated product of Vn1 and In1; which time-integrated product in determined by the degree to which the duration of the lower transistor's ON-time is longer than 50% of the total period during which the magnitude of the voltage Vn1 across lower switching transistor ST1 is of substantially zero magnitude.

The duration of the ON-time of lower switching transistor ST1 is mainly determined by two factors: (i) the amount of volt-seconds required to cause saturation of saturable current transformer SCT1; and (ii) the magnitude of the bias voltage present at bias junction BJ1.

The magnitude of the bias voltage present at bias junction BJ1 is determined by bias control circuit BCC; which, by sensing (via auxiliary winding AWb) the magnitude of the voltage present across tank inductor Lt, controls—via controlled leakage of charge from bias capacitor BC1—the magnitude of the bias voltage at bias junction BJ1 such as to prevent the magnitude of the voltage across tank inductor Lt from exceeding a pre-set level. In other words, via negative feedback, the magnitude of the bias voltage across bias capacitor BC1 is automatically adjusted so as to prevent the magnitude of the current flowing through tank inductor It from exceeding a pre-set level.

With reference to FIG. 8 (c) and (f), when the L-C circuit is loaded with fluorescent lamp FL, the magnitude of the bias voltage decreases, such as from about −8 Volt to about −0.5 Volt, and the duration of the ON-time of lower switching transistor ST1 increases correspondingly, as indicated by FIG. 8(d).

With reference to FIG. 8(b), the magnitude of the current drawn by energy-storing inductor ESIa from the DC+ terminal during situations when the L-C circuit is unloaded—which corresponds to the situation depicted by FIG. 8 (a) and (c)—is very small; and, with reference to FIG. 7, the corresponding amount of energy drawn by the inverter from the power line is relatively even smaller.

With reference to FIG. 8(e), the magnitude of the current drawn by energy-storing inductor ESIa from the DC+ terminal during situations when the L-C circuit is loaded—which corresponds to the situation depicted by FIG. 8 (d) and (f)—is now much larger; and, with reference to FIG. 7, the corresponding amount of energy drawn by the inverter from the power line is relatively even much larger.

It should be noted—as clearly shown in FIG. 8(b)—that energy-storing inductor ESIa is only being charged from the DC+ terminal during the actual duration of the ON-time of lower switching transistor ST1. It is prevented by high speed rectifier HSRx from being charged during the brief period just preceeding that ON-time.

Each time after completion of the ON-time of lower switching transistor ST1, the energy stored in energy-storing inductor ESIa is discharged into energy-storing capacitors ESC1 and ESC2 via commutating diode CD2; which energy-storing capacitors provide the energy drawn by the inverter.

The amount of energy stored in energy-storing inductor ESIa increases with the square of the duration of the ON-time, but only linearly with the magnitude of the voltage at the DC+ terminal.

For a given load on the L-C circuit, the amount of energy drawn from the inverter's output will be approximately proportional to the RMS magnitude of the fundamental harmonic component of the inverter's symmetrical or asymmetrical squarewave output voltage: the more asymmetrical the inverter's output voltage, the lower the RMS magnitude of this fundamental harmonic component. More particularly, the RMS magnitude of the fundamental harmonic component is—up to the point where the inverter's output voltage becomes totally symmetrical—proportional to the duration of the shorter of the two sections of the inverter's squarewave output voltage; which is to say: proportional to the length of the period during which the voltage (ex: Vn1 or Vf1) across lower switching transistor ST1 is substantially of zero magnitude.

Also, again for a given load on the L-C circuit, the amount of power drawn from the inverter's output will be approximately proportional to the magnitude of the inverter's DC supply voltage; which is the voltage present between the B− bus and the B+ bus.

Consequently, with reference to FIG. 7, since in any steady-state situation the amount of power drawn from the power line must be approximately equal to the amount of power drawn from the inverter's output, for a given degree of symmetry in the inverter's output voltage (which implies a certain fixed amount of power drawn from the power line), the magnitude of the inverter's DC supply voltage will have to stabilize at a point where the amount of power drawn from the inverter's output equals that drawn from the power line.

Thus, for instance, with a power supply made in accordance with the arrangement of FIG. 6, and with that power supply being designed to provide a given amount of output power to a given load at a given line voltage at a given percentage duty-cycle, then: if the magnitude of the line voltage were to increase by 10%, the magnitude of the DC voltage would (for a given duty-cycle) increase by 10% (which would cause a 10% increase in the amount of power drawn from the inverter), or—to prevent the magnitude of the DC supply voltage from increasing—the duty-cycle would have to be decreased by 10%. Or, with the same power supply, if—for a given power line voltage and DC supply voltage—the loading on the L-C circuit were to be changed such that the amount of power required to be provided from the inverter's output were to decrease by a factor of four, the percentage duty-cycle would have to be decreased by a factor of two.

By way of specific quantitative example, if—for a given power line voltage (ex: 120 Volt), a given DC supply voltage (ex: 400 Volt), a given inverter cycle-period (ex: 30 microseconds, corresponding to about 33 kHz), and a given duty-cycle (ex: about 15 out of 30 micro-seconds)—the maximum power supplied from the inverter to the L-C circuit were to be 70 Watt (as would be typical in a two-lamp fluorescent lamp ballast), then—to provide for a situation of supplying only about 1.5 Watt inverter output (which would be a typical idling power for the unloaded L-C circuit)—the duty-cycle would have to be reduced to about 2 out of 30 micro-seconds, thereby cutting power drawn from the power line by a factor of about 50.

Additional comments (a) The inverters of FIGS. 1, 3, 4 and/or 5 may be either of the self-oscillating type—as is indeed the arrangement of FIG. 1—or of the so-called driven type. In either case, it is important to provide for feedback means whereby the inversion frequency is caused to increase sharply if the magnitude of the DC supply voltage were to increase beyond a pre-determined level. Otherwise, circuit self-destruction would occur if the circuit were to be powered without being loaded.

(b) Details of the inverter drive and control circuit have only been shown in connection with the arrangement of FIG. 1. However, similar drive and control circuits can be used for the other arrangements shown.

(c) In FIGS. 3-5, the block labeled Inverter Control Circuitry is shown as having a connection with the B+ bus; which connection is meant to indicate that the Inverter Control Circuitry has to obtain information with respect to the magnitude of the DC supply voltage. In reality, such information can be obtained in various ways, such as via an auxiliary or secondary winding on an inverter output transformer—such as in the arrangement of FIG. 1.

(d) Fluorescent lamp FL is indicated to be of a so-called Instant-Start type; which type does not require an external supply of cathode heating power. However, if using so-called Rapid-Start fluorescent lamps, externally supplied cathode heating power would be required. In the arrangement of FIG. 1, such externally supplied cathode heating power may be obtained by adding secondary windings to auto-transformer AT.

(e) In the arrangement of FIG. 1, elements RR1 and RD1, which are series-connected across secondary winding CT1s of saturable current transformer CT1, serve the function of permitting the reverse or reset current provided from secondary winding CT1s to flow in such manner as not to affect the charge on bias capacitor BC1. That way, except for the minute amount of current provided via bias resistor BR1, all the current flowing into the base of transistor Q1 gets sucked out of bias capacitor BS1, thereby causing the bias voltage at junction J1 to grow ever more negative, except if allowed to leak away.

In a controlled manner—via leakage resistor LR and control transistor CQ1—the negative charge on bias capacitor BC1 it is indeed allowed to leak away. However, if the magnitude of the inverter DC supply voltage (i.e., the DC voltage on capacitor ESC) were to get too high, the leakage path through transistor CQ1 would be opened; and the magnitude of the negative bias on bias capacitor BC1 would increase to the point of causing the inverter to cease oscillating.

Of course, the situation with respect to elements RR2 and RD2—as associated with transistor Q2—is the same as for elements RR1 and RD1.

(f) In the arrangement of FIG. 6, the purpose of high speed rectifier HSR is twofold: (i) in case of transients on the power line, it provides a clamping function in that it prevents the magnitude of the any voltage present between terminals DC— and DC+ from exceeding the voltage present across the two series-connected energy-storing capacitors ESC1 and ESC2; and (ii) at the end of each inductive charging cycle in energy-storing inductor ESIa, a point comes where the current flowing through that inductor ceases to flow into energy-storing capacitors ESC1 and ESC2, yet—due to lack of perfect coupling between the individual turns on the energy-storing inductor—there is some small amount of energy still remaining in that inductor, which remaining energy has an efficient way of discharging itself into the energy-storing capacitors via high speed rectifier HSR.

(g) Auxiliary winding AWa on energy-storing inductor ESIa is used for the purpose of sensing the magnitude of the inverter's DC supply voltage (i.e., the voltage present between the B— bus and the B+ bus). The peak-to-peak voltage provided from the AWa winding constitutes a direct measure of the magnitude of that DC supply voltage.

(h) Bias control circuit BCC of FIG. 6 performs a function corresponding to that of the inverter control circuitry ICC" of FIG. 5. Basically, the function of bias control circuit BCC is that of permitting controlled leakage of charge from bias capacitor BC1, thereby to permit controlled functioning of the inverter.

Without permitting charge to leak away from bias capacitor BC1, its (negative) voltage magnitude would keep on increasing due to the (positive) current flowing into the base of transistor ST1 each cycle; which positive base current can only come from the bias capacitor, which therefore causes its voltage to go more negative. As a consequence of such ever-increasing negative bias voltage, the duration of the ON-time of first switching transistor ST1 would keep decreasing in a corresponding manner; which, in turn, would cause a correspondingly decreased amount of energy to be supplied each cycle by the inverter to the L-C circuit and its load. Eventually, barring breakdown (such as base-emitter Zenering in transistor ST1), the amount of energy provided per cycle would become negligible and the inverter would cease providing any power from its output.

Basically, bias control circuit BCC functions such as to cause an amount of charge to leak away from the bias capacitor each individual inverter cycle; the amount of charge being leaked away each cycle depending—in the particular arrangement of FIG. 6—upon the magnitudes and/or phasing of the control signals provided from auxiliary winding AWa and/or from auxiliary winding AWb.

The above-enunciated concept of cycle-by-cycle bias control is important in connecton with maintaining stable inverter operation.

(i) As illustrated in FIG. 7, for a substantially constant inverter frequency, the amount of energy drawn from the power line is a function of the square of the duration of the ON-time of transistor ST1. Since the power provided to the inverter's output must necessarily equal the amount of power drawn from the power line, an important implication is that it takes a relatively modest change in this ON-time to control to a substantial degree the amount of power provided to whatever load is connected with the L-C circuit.

In case of a fluorescent lamp, the implication is that wide-range light output control may be accomplished by way of controlling over but a modest range the duration of the ON-time of one of the inverter's two switching transistors.

(j) Bias control circuit BCC of FIG. 6 is operative, not only to control and/or limit the maximum magnitude of the high frequency voltage developing across tank inductor Lt (and thereby across tank capacitor Ct), but is also operative—by way of sensing the peak-to-peak magnitude of the voltage provided at the output of auxiliary winding AWa—to control and/or limit the maximum magnitude of the DC supply voltage as it appears between the B— bus and B+ bus.

(k) Furthermore, bias control circuit BCC is operative to control the symmetry of the rectangular voltage provided at the inverter's output terminal (J1). For instance, if fluorescent lamp FL were to be removed, the inverter's rectangular output voltage would appear like that of Vn1 of FIG. 8(a). However, with fluorescent lamp FL fully loading the inverter's output, the inverter's rectangular output voltage would appear like that of Vf1 of FIG. 8(d).

The essential difference between voltage Vn1 and voltage Vf1 may best be understood by considering the two rectangular voltage waveforms from the standpoint of their individual sinusoidal Fourier or harmonic components: (i) voltage Vf1—being essentially a squarewave voltage—has a fundamental (sinusoidal) component of relatively large magnitude; whereas (ii) the highly asymmetrical rectangular voltage Vn1 has a fundamental (sinusoidal) component of relatively small magnitude.

In other words, irrespective of the peak-to-peak magnitude of the inverter's rectangular output voltage, the magnitude of the fundamental (sinusoidal) voltage component of the inverter's rectangular output voltage may be controlled over a wide range by way of bias control circuit BCC.

(l) Bias control circuit BCC is shown connected in circuit with the first (or lower) switching transistor. However, it could just as well have been connected in circuit with the second (or upper) switching transistor.

In fact, in some situations it is advantageous to provide for a bias control circuit for each of the two switching transistors.

(m) In FIG. 6, the purpose of rectifier HSRx is that of providing a wider minimum-to-maximum ratio in terms of the amount of energy drawn by the inverter circuit from the DC+/DC— terminals. However, in many situations, rectifier HSRx may simply be eliminated, especially when using field effect transistors rather than the indicated bi-polar transistors.

(n) In the arrangement of FIG. 6—and with reference to FIG. 8 (a), (b), (d) and (e)—it should be noted that energy-storing inductor ESIa is only being charged from the DC+ terminal for part of the period during which the instantaneous magnitude of the inverter output voltage (i.e., Vn1 or Vf1) is at its minimum (i.e., near zero) magnitude. As indicarted above, this fact is a result of the function of rectifier HSRx; which rectifier HSRx prevents energy-storing inductor ESIa from being charged during the periods when current is flowing through commutating diode CD1.

(o) It is believed that the present invention and its several attendant advantages and features will be understood from the preceeding description. However, without departing from the spirit of the invention, changes may be made in its form and in the construction and/or interrelationships of its component parts, the form herein presented merely representing the currently preferred embodiment.

I claim:

1. An arrangement comprising:
a source providing an AC voltage at a pair of AC terminals;
rectifier means connected with the AC terminals and operative to provide a first DC voltage at a first pair of DC terminals;
an inverter means having plural inverter terminals;
tuned L-C circuit means connected with at least one of the plural inverter terminals;
a gas discharge lamp connected with the L-C circuit;
energy-storing capacitor means having a second pair of DC terminals across which there exists a second DC voltage; the energy-storing capacitor means being connected with at least two of the plural inverter terminals; and
energy-storing inductor means connected in circuit between the first pair of DC terminals and at least one of the plural inverter terminals;
the arrangement being functional to: (i) draw current from the source in such manner that this current has an instantaneous magnitude that is substantially proportional to the instantaneous magnitude of the AC voltage; and (ii) causing the energy-storing capacitor means to be charged by way of the inverter means and in such manner as to cause the magnitude of the second DC voltage to be substantially constant.

2. The arrangement of claim 1 wherein: (i) the AC voltage is substantially sinusoidal; and (ii) the current drawn from the source is sinusoidal to the degree of containing no more than about 10% of harmonic components.

3. The arrangement of claim 1 wherein: (i) the inverter means has a first, a second and a third inverter terminal; (ii) the first and second inverter terminals are connected with the second pair of DC terminals; (iii) the third inverter terminal is connected with the energy-storing inductor means; (iv) the energy-storing capacitor means a has a center tap; and (v) the tuned L-C circuit means is connected between the third inverter terminal and the center tap.

4. The arrangement of claim 1 combined with an inverter control circuit, wherein: (i) the resulting combination is functional to establish an inverter output voltage between one of the plural inverter terminals and one of the second pair of DC terminals; (ii) the inverter output voltage has a waveshape consisting of a fundamental sinusoidal component and plural harmonic components; and (iii) the inverter control circuit is functional to control the waveshape of the alternating inverter voltage in such manner as to controllably vary the magnitude of the fundamental sinusoidal component.

5. The arrangement of claim 1 wherein the instantaneous absolute magnitude of the first DC voltage is approximately equal to that of the AC voltage.

6. The arrangement of claim 1 wherein: (i) the inverter means constitutes a three-terminal two-position electronic switching means having a first, a second and a third terminal, as well as a first and a second position; (ii) the first and second terminals are connected with the second pair of DC terminals; (iii) the third terminal is connected with the tuned L-C circuit means as well as with the energy-storing inductor means; and (iv) the electronic switching means is operative to to alternate between the first and second positions, the first position being one in which the third terminal is effectively connected with the first terminal, the second position being one in which the third terminal is effectively connected with the second terminal.

7. The arrangement of claim 1 combined with means substantively operative to manifestly prevent the magnitude of the first DC voltage from exceeding that of the second DC voltage.

8. The arrangement of claim 1 wherein, during normal operation, the absolute magnitude of the second DC voltage is equal to at least twice the absolute peak magnitude of the AC voltage.

9. The arrangement of claim 1 wherein: (i) the inverter means comprises plural switching transistors, each having a pair of main transistor terminals; and (ii) only two of these plural switching transistors are subjected across their main transistor terminals to a voltage of maximum magnitude about equal to that of the second DC voltage.

10. The arrangement of claim 1 wherein: (i) the inverter means comprises plural switching transistors, each having a pair of main transistor terminals; and (ii) at any given time, only one of these plural switching transistors is subjected across its main transistor terminals to a voltage of magnitude about equal to that of the second DC voltage.

11. The arrangement of claim 1 combined with control means operative to prevent the magnitude of the second DC voltage from exceeding a predetermied magnitude.

12. The arrangement of claim 1 wherein: (i) the tuned L-C circuit means has a pair of power output terminals operative to connect with the gas discharge lamp means; and (ii) the inverter means is connected with a control circuit means operative to sense the magnitude of the voltage across the power output terminals and to prevent this magnitude from exceeding a predetermined level.

13. An arrangement comprising:
a source providing a power line AC voltage at a pair of power line terminals;
rectifier means connected with the power line terminals and operative to provide a first DC voltage across a first pair of DC terminals;
energy-storing capacitor means having a second pair of DC terminals across which there exists a second DC voltage; the second pair of DC terminals being connected between a B− bus and a B+ bus, such that the second DC voltage also exists between the B− bus and B+ bus; there being a center-tap between the second pair of DC terminals;
half-bridge inverter means having a B− terminal and a B+ terminal connected, respectively, with the B− bus and the B+ bus; the half-bridge inverter means having an inverter center terminal; which inverter center terminal, by inverter action, is periodically and alternatingly connected with the B− terminal and the B+ terminal;

tuned L-C circuit means connected between the center-tap and the center terminal; the tuned circuit means having a pair of power output terminals adapted to be connected with a gas discharge lamp means; and energy-storing inductor means connected in circuit between the first pair of DC terminals and the inverter center terminal.

14. The arrangement of claim 13 wherein: (i) the half-bridge inverter means is operative to produce an alternating voltage between the center-tap and the inverter center terminal; the alternating voltage having a fundamental period and being characterized by alternating between being of a substantially constant positive voltage and being of a substantially constant negative voltage; the absolute magnitude of the substantially constant positive voltage being essentially equal to that of the substantially constant negative voltage; and (ii) the alternating voltage is of said substantially constant negative voltage for a certain fraction of the total duration of said fundamental period.

15. The arrangement of claim 14 combined with control means operative to control said certain fraction.

16. The arrangement of claim 15 wherein the control means is operative to control said certain fraction in response to the magnitude of the alternating voltage.

17. The arrangement of claim 14 wherein said certain fraction is substantially lower than one half.

18. An arrangement comprising:
a source providing a power line AC voltage at a pair of power line terminals;
rectifier means connected with the power line terminals and operative to provide a first DC voltage across a first pair of DC terminals;
energy-storing capacitor and inverter means; the energy-storing capacitor and inverter means having a B— terminal and a B+ terminal between which there exists a second DC voltage; the energy-storing capacitor and inverter means having a set of inverter terminals between two of which there exists an alternating inverter voltage;
tuned L-C circuit means connected with the inverter terminals; the tuned L-C circuit means having a pair of power output terminals adapted to connect with a gas discharge lamp means; and
an energy-storing inductor connected in circuit between the first pair of DC terminals and the inverter terminals.

19. The arrangement of claim 18 wherein unidirectional current pulses periodically flow from one of said first pair of DC terminals through the energy-storing inductor and to one of the inverter terminals.

20. An arrangement comprising:
a source providing an AC power line voltage at a pair of power line terminals;
rectifier means connected with the power line terminals and operative to provide a first DC voltage at a pair of DC terminals;
energy-storing inverter means: (i) having plural inverter terminals, including a first, a second, a third and a fourth inverter terminal; (ii) having an energy-storing capacitor means connected between the first and the second inverter terminal; (iii) having a second DC voltage present between the first and the second inverter terminals; and (iv) being operative, periodically and alternatingly, to cause the third inverter terminal to be connected with the first and the second inverter terminal, such as to cause a rectangular inverter output voltage to be provided between the third and the fourth inverter terminal;

load means connected in circuit with the third and the fourth terminals, thereby to be powered by the rectangular inverter voltage; the load means having a set of load terminals operative to connect with a gas discharge lamp means; there being a load voltage present at the load terminals; and energy-storing inductor means connected in circuit between the DC terminals and the plural inverter terminals;

the arrangement being operative to draw a power line current in response to the power line voltage and in such manner that the waveform of the power line current is substantially equal to that of the power line voltage.

21. The arrangement of claim 20 wherein the energy-storing inverter means includes control means operative to control the symmetry of the rectangular inverter output voltage as a function of the magnitude of the load voltage.

22. The arrangement of claim 20 wherein the magnitude of the second DC voltage is substantially constant and at least twice as large as the peak magnitude of the first DC voltage.

23. The arrangement of claim 20 wherein the absolute instantaneous magnitude of the first DC voltage is about equal to that of the power line voltage.

24. The arrangement of claim 20 wherein the energy-storing inverter means includes control-means operative to prevent the magnitude of the second DC voltage from exceeding a predetermined level.

25. An arrangement comprising:
a source providing an AC power line voltage at a pair of power line terminals;
rectifier means connected with the power line terminals and operative to provide a pulsating DC voltage at a pair of DC terminals;
converter means connected with the DC terminals and operative to provide a periodic rectangular converter output voltage at a pair of converter output terminals; the periodic rectangular converter output voltage having a peak-to-peak magnitude and plural harmonically related sinusoidal voltage components; the peak-to-peak magnitude remaining substantially constant throughout the duration of a complete cycle of the AC power line voltage; the converter means having control means operative, in response to a control action, to control the symmetry of the periodic rectangular converter output voltage, thereby to control the relative magnitudes of the plural harmonically related sinusoidal voltage components; and
frequency-selective load means connected with the converter output terminals and operative to connect with a gas discharge lamp means; the load means being principally responsive to only one of the plural harmonically related sinusoidal voltage components;
such that the arrangement is operative, in response to said control action, to control the magnitude of said only one of the plural harmonically related sinusoidal voltage components relative to the magnitudes of the other ones of the plural harmonically related sinusoidal voltage components.

26. The arrangement of claim 25 wherein: (i) a power line current flows from the power line terminals to the rectifier means; and (ii) the waveform of the power line current is approximately equal to that of the AC power line voltage.

27. The arrangement of claim 25 wherein: (i) the AC power line voltage is of a substantially sinusoidal waveform; (ii) a power line current flows between the power line terminals and the rectifier means; and (iii) the power line current is of a substantially sinusoidal waveform, having a total harmonic distortion not higher than about 10%.

28. The arrangement of claim 25 wherein: (i) a converter output current flows from the converter output terminals; and (ii) the control means is operative to limit the maximum magnitude of the converter output current.

* * * * *